Jan. 8, 1952  C. BEAUREGARD  2,581,572
CHILD'S COASTING DEVICE
Filed April 11, 1951
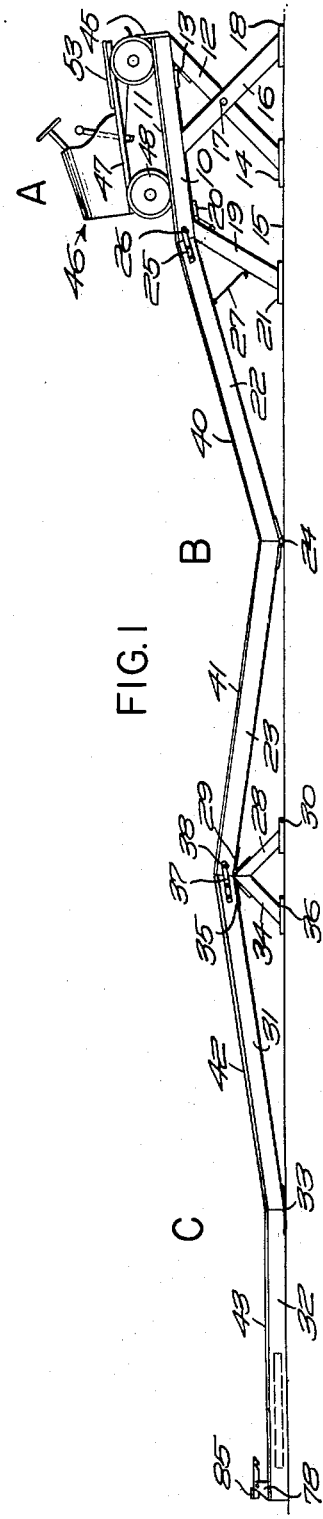
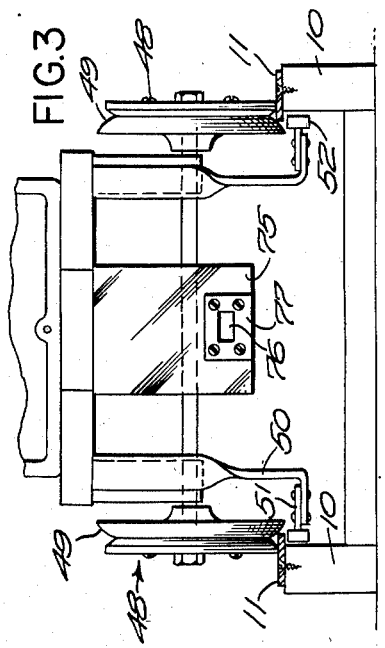
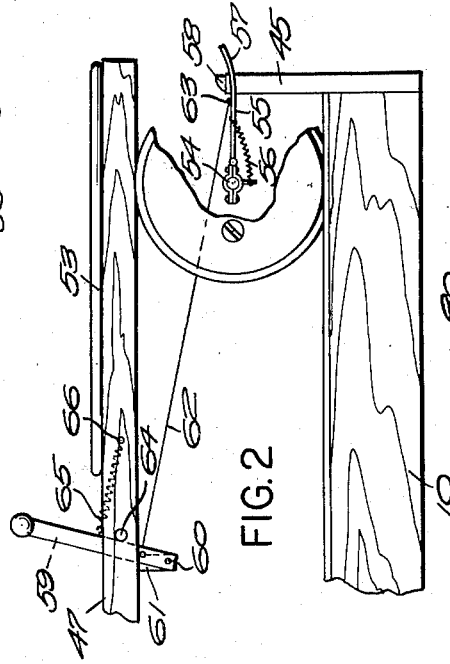
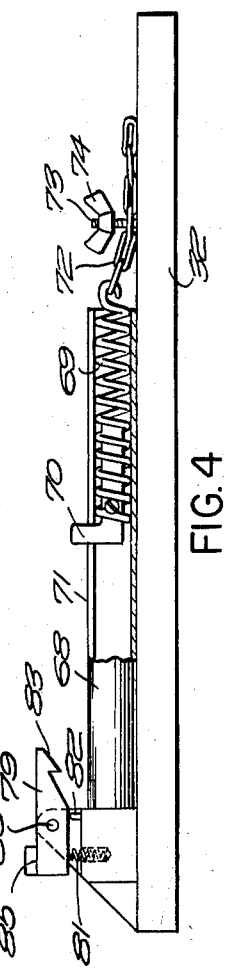
INVENTOR.
Charles Beauregard
BY
Barlow & Barlow
ATTORNEYS Patented Jan. 8, 1952

2,581,572

UNITED STATES PATENT OFFICE 2,581,572

CHILD'S COASTING DEVICE

Charles Beauregard, Providence, R. I.

Application April 11, 1951, Serial No. 220,483

7 Claims. (Cl. 104—69)

This invention relates to a child's coasting device and is more particularly for the amusement of a child.

One of the objects of this invention is to provide a coasting device of a size which may carry a child and yet is of such a size that it may be set up within a cellar of a dwelling of substantial size for the amusement of the child.

Another object of this invention is to provide a device in which the weight of the child furnishes the motive force for not only moving the car along a track but also furnishes sufficient energy to charge a spring so that when the child gets out of the car and trips a holding device, the spring will return the car to its starting point.

Another object of this invention is to provide a device in which the car will be held in its raised position on its track until it is desired that the same shall roll forwardly when the child in the car may release a lock so that the car may move forwardly.

Another object of this invention is to lock the car at the end of its run with a spring charged or compressed so that the child may get out of the car and the car will remain still until the child does alight, after which a latch may be tripped for the return of the car to starting position.

Another object of this invention is to provide a track which may be easily folded when the device is not in use.

With these and other objects in view, the invention consists of certain novel features of construction, as will be more fully described and particularly pointed out in the appended claims.

In the accompanying drawings:

Figure 1 is an elevation of the device;

Figure 2 is a fragmental, enlarged view showing the manner of holding the car in the raised position on the track;

Figure 3 is a fragmental view of the front end of the car and illustrating how the car is held on the track; and Figure 4 is an enlarged view of the spring which becomes charged for returning the car to the raised end of the track after the car has completed its run on the track.

In proceeding with this invention, a track is provided which may have a raised portion intermediate its ends, whch track is raised at one end so as to provide sufficient energy for a car on the track with its occupant to roll down the incline of the track over the raised portion and thence to the end of the track. However, prior to the time that the car and its occupant reach the end of the track, the car is slowed down in its movement by engaging a spring which becomes charged by the energy of the rolling car and when the car reaches the end of the track, the spring brings the car substantially to a stop and a latch engages the car to hold it in this position. Thereafter, it becomes merely necessary for the child to alight from the car, trip the latch and the car returns to its starting position by reason of the energy stored in the spring.

With reference to the drawings, the track which is provided is formed in three sections. The raised section is designated A; the next section is designated B; and the third section is designated C.

The first section comprises spaced members 10, upon which a track 11 of metal is secured which overhangs the inner edge of the members 10. These members 10 are supported by legs 12 hinged as at 13 to the member each of which has a foot 14 to engage a surface 15. To this set of legs 12, there is pivoted as at 17 a set of legs 16 which engage some sort of a stop beneath the frame members 10. A foot 18 is also provided on each leg 16. At the forward end of the frame 10, there is another set of legs 19 hinged as at 20 and each having a foot 21. Thus, this section 10 may be supported in elevated position, as shown in Figure 1.

The next section B comprises pairs of frame members 22 and 23 hinged together as at 24, which hinge is supported on the horizontal surface 15. This section is provided with hooks 25 to engage the pin 26 on the section frames 10 so as to hold it in position to this frame section, and it is also supported by a hook 27 which also serves to connect it to the section A. At the opposite end there is a leg 28 hinged as at 29 to frame members 23 and provided with a foot 30.

The section C provides a pair of members 31 and 32 hinged as at 33 and elevated at one end by means of a leg 34 hinged as at 35 to the frame members 21 and provided with feet 36. This section is connected to the section B by a pivoted hook 37 which engages a pin 38 on the outer surface of the member 23. The frame members 32 lie along the surface 15 which forms the lower end of the track. Each of the sections has tracks 40, 41 and 42, 43 which are like the tracks 11 and overhang the inner edge of the frame members upon which they are supported. They are each of the same thickness so as to substantially form a continuation one of the other at the joints.

The section A has a post 45 extending upwardly at the end of the frame which serves as a means for holding the car which I designate generally 46 at the upper portion of this section A.

This car comprises essentially a platform 47 which is supported upon four wheels 48 so as to freely roll along the track. The wheels are provided with beveled flanges 49 which engage the inner edges of the tracks 11 so as to guide the car along the tracks, while guards comprising brackets 50 with arms 51 extending beneath the tracks are equipped with rollers 52 so that should the car lift from the tracks, it would be prevented from leaving the tracks by the rollers 52 engaging the under surface of the tracks 11.

A seat 53 is provided on the car, upon which the child may sit. Pivoted on the rear axle 54 of the car there is an arm 55 which is swung downwardly by means of a spring 56 but which may rise upwardly to tension the spring through an arc less than ninety degrees. This arm 55 is curved upwardly as at 57 and provided with an opening so that this arm will engage the upper end 58 of the post 48 and ride up over the post so that its opening will drop over the post by reason of the spring pulling it downwardly and thus would hold the car in the position shown in Figure 1. In order to release the car, a lever 59 is pivoted as at 60 on a bracket 61 extending downwardly from the platform 47 and is connected by a rod 62 to the point 63 on the arm 55 so that if the lever 59 is moved forwardly, the arm will be raised and the car released. The lever 59 is held against a stop 64 by means of spring 65 extending from the lever to a point 66 on the platform 47 and this stop also serves to limit downward swinging of the arm 55. It thus becomes only necessary for a child sitting on the seat 53 to push the lever forwardly and the car rolls down the incline of the track.

At the lower end of the track I have provided a cylinder 68 which contains a spring 69 connected to a slide 70 to move through a slot 71 in the cylinder 68 and extend or load the spring which is tied by means of a chain 72 and bolt 73 in different positions of adjustment on the frame section C; that is, the wing nut 74 may be taken from the bolt and different links of the chain placed on the bolt to accommodate various loads in the car.

The car has an abutment 75 extending downwardly from its front end, as shown in Figure 3, with an opening 76 in it surrounded by a metal plate 77. This metal plate is so positioned that it will engage the slide 70 as the car moves down the track and stretch the spring which also slows down the car as it approaches the end of the track. The spring is so selected that it will stretch sufficiently so that under certain weights of the car, the car will roll to the end of the track and be there stopped by suitable abutments 78. At the time the car does engage these abutments, a latch 79 pivoted as at 80 will pass through the opening 76 and hold the car in this position. This latch is urged by spring 81 against a stop 82 but by reason of its bevel or inclined surface 83 will lift as the abutment 75 engages it and permit its hook portion to extend through and over the opposite edge of the opening 76 so as to hold the car at the end of its run. It then becomes merely necessary for the child to alight from the car which is held against movement and thus there is not much danger of the child being injured in alighting from a stationary car. The child may then walk to the end of the track and press upon the portion 85 of the latch with his foot, releasing the latch and permitting the spring to contract and give the car sufficient momentum to roll it back to the top of its run where the arm 55 will lift as it engages the post 45 and drop over the post so as to lock the car in a position for the child to climb into it again and have another ride.

I claim:

1. In a child's coasting device, a track with one end higher than the other, a child-carrying car adapted to travel over the said track, locking means between said car and the raised end of the track to releasably secure the car at the upper end of the track, resilient means engaged by the car near the end of the track to retard the movement of the car and itself become charged when engaged by the loaded car, means to stop the car and hold the same against being returned by the resilient means, means to release said holding means to cause the resilient means to return said car when unloaded toward the starting end of the track.

2. In a child's coasting device as in claim 1 wherein the resilient means is sufficiently powerful to cause the car to travel to the raised end of the track.

3. In a child's coasting device as in claim 2 wherein the locking means will engage and hold the car in place when returned to the upper end of the track.

4. In a child's coasting device as in claim 1 wherein the locking means has a releasable lever accessible to a child in riding position on said car.

5. In a child's coasting device as in claim 1 wherein the locking means has a lever carried by the car to release the car from being held in raised position.

6. In a child's coasting device as in claim 1 wherein the resilient means is a spring to become charged.

7. In a child's coasting device as in claim 1 wherein the holding means at the lower end of the track comprises a latch on the track and a catch carried by the car.

CHARLES BEAUREGARD.

REFERENCES CITED

The following references are of record in the file of this patent:

UNITED STATES PATENTS

| Number | Name | Date |
|---|---|---|
| 309,689 | Campbell | Dec. 23, 1884 |
| 1,230,559 | Burke | June 19, 1917 |

FOREIGN PATENTS

| Number | Country | Date |
|---|---|---|
| 13,291 of 1885 | Great Britain | Nov. 3, 1885 |